United States Patent
Blake et al.

(10) Patent No.: US 8,402,394 B2
(45) Date of Patent: Mar. 19, 2013

(54) THREE-DIMENSIONAL WEBSITE VISUALIZATION

(75) Inventors: Stephen Blake, San Francisco, CA (US); Ankarino Lara, San Francisco, CA (US); Noel Morrison, San Francisco, CA (US); Scott Bedard, San Francisco, CA (US); Lucas J. Shuman, Berkeley, CA (US)

(73) Assignee: YAHOO! Inc., Sunnyvale, CA (US)

( * ) Notice: Subject to any disclaimer, the term of this patent is extended or adjusted under 35 U.S.C. 154(b) by 772 days.

(21) Appl. No.: 11/864,152

(22) Filed: Sep. 28, 2007

(65) Prior Publication Data

US 2009/0089714 A1  Apr. 2, 2009

(51) Int. Cl.
*G06F 3/048* (2006.01)
(52) U.S. Cl. .......................... 715/850; 715/848
(58) Field of Classification Search .......... 715/848, 715/850
See application file for complete search history.

(56) References Cited

U.S. PATENT DOCUMENTS

| | | | |
|---|---|---|---|
| 5,555,354 A * | 9/1996 | Strasnick et al. | 345/427 |
| 6,950,791 B1 * | 9/2005 | Bray et al. | 703/22 |
| 7,043,702 B2 * | 5/2006 | Chi et al. | 715/853 |
| 7,126,579 B2 * | 10/2006 | Ritter | 345/156 |
| 2001/0028369 A1 * | 10/2001 | Gallo et al. | 345/848 |
| 2002/0055919 A1 * | 5/2002 | Mikheev | 707/3 |
| 2002/0196272 A1 | 12/2002 | Ramos et al. | |
| 2003/0011636 A1 | 1/2003 | Feroglia et al. | |
| 2004/0030741 A1 * | 2/2004 | Wolton et al. | 709/202 |
| 2005/0131924 A1 * | 6/2005 | Jones | 707/100 |
| 2005/0216515 A1 * | 9/2005 | Bray et al. | 707/104.1 |
| 2006/0212459 A1 * | 9/2006 | Sugimura | 707/100 |
| 2007/0064003 A1 | 3/2007 | Crossland | |
| 2009/0063552 A1 * | 3/2009 | Jones | 707/102 |

* cited by examiner

*Primary Examiner* — William Bashore
*Assistant Examiner* — Henry Orr
(74) *Attorney, Agent, or Firm* — Fiala & Weaver P.L.L.C.

(57) ABSTRACT

Methods, systems, and apparatuses for visualizing content of one or more websites are provided. An amount of available content contained by at least one website is determined. A three-dimensional object is displayed having a surface. Each location of the surface of the three-dimensional object corresponds to a portion of the determined amount of available content contained by the website(s). A user is enabled to select a location of the surface of the three-dimensional object. The selected location is mapped to the corresponding portion of the determined amount of available content contained by the website(s). Content of the website(s) corresponding to the selected location, such as a web page, video, audio, an RSS feed, etc., can be accessed by selection of the location. Interaction of the user with the website(s) can be tracked, and the resulting tracking information can be displayed on the three-dimensional object.

21 Claims, 9 Drawing Sheets

| content of website 212 | corresponding location of three-dimensional object 302 |
|---|---|
| webpage A | location 308a |
| video file B | location 308b |
| webpage C | location 308c |
| image D | location 308d |
| ... | ... |
| RSS feed Y | location 308y |
| audio file Z | location 308z |

702 enable a user to interact with the portion of the available content of the website corresponding to the selected location

1300

| content of website 212 | corresponding location on three-dimensional object 302 | first user interaction flag | second user interaction flag | third user interaction flag | popularity indication |
|---|---|---|---|---|---|
| webpage A | location 308a | yes | no | yes | 3 |
| video file B | location 308b | no | no | yes | 2 |
| webpage C | location 308c | no | yes | no | 2 |
| image D | location 308d | yes | yes | yes | 5 |
| ... | ... | | | | |
| RSS feed Y | location 308y | no | no | yes | 2 |
| audio file Z | location 308z | yes | yes | yes | 5 |

FIG. 13

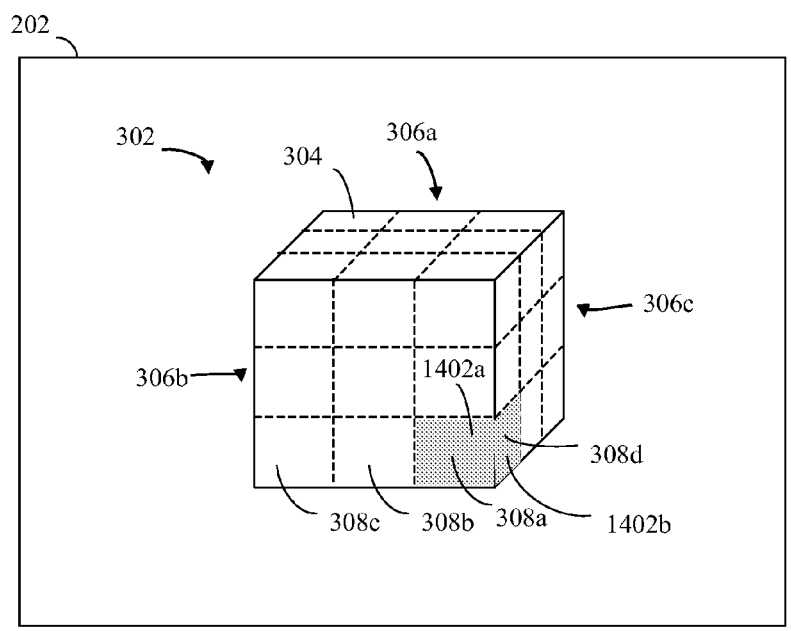

FIG. 14

THREE-DIMENSIONAL WEBSITE VISUALIZATION

BACKGROUND OF THE INVENTION

1. Field of the Invention

The present invention relates to the World Wide Web, and in particular, to browsing of websites located on the World Wide Web.

2. Background Art

A website is a collection of web pages, images, videos, audio files, and/or other content that is hosted on one or more web servers. A website may contain any quantity of web pages and other items/assets of content, including hundreds, thousands, millions, or even more such items of content. All publicly accessible websites collectively form the "World Wide Web." It has been estimated that the total number of web pages accessible on the World Wide Web is approaching 10 billion.

Websites are typically accessed by users across a network, such as the Internet, using a tool called a browser. Typically, a user must browse through many pages of a website to determine a relative size of the website and/or to locate all the links of the website. A convenient way does not exist for ascertaining the scope of a website, nor does a convenient way exist for accessing all links to content of the website.

When a user clicks on a link in a web page to access the content associated with the link, the link will typically change color to indicate that the link has been accessed. Thus, the color of links may be used to determine whether content corresponding to specific links has been accessed. However, a convenient way does not currently exist for users to keep track of the web pages in a website that the user has accessed.

Thus, what is needed are ways for users to ascertain the scope of websites. Furthermore, what is needed is a convenient way of providing access to a user to all content of a website, and a way of keeping track of the particular content in a website that a user has accessed.

BRIEF SUMMARY OF THE INVENTION

Methods, systems, and apparatuses for visualizing content of one or more websites are provided. A three-dimensional object is displayed. The three-dimensional object has a surface that corresponds to an amount of accessible content of the one or more websites. Each location of the surface corresponds to a particular content item/asset of the one or more websites. Such locations of the surface of the three-dimensional object may have any size, including each location being a region of the surface, or a single pixel of the surface.

In a first example aspect, an amount of available content contained by a website is determined. A three-dimensional object is displayed having a surface. Each location of the surface of the three-dimensional object corresponds to a portion of the determined amount of available content contained by the website. A user is enabled to select a location of the surface of the three-dimensional object. The selected location is mapped to the corresponding portion of the determined amount of available content contained by the website.

In a further aspect, selection of a location on the surface of the three-dimensional object can provide access to content of the website corresponding to the selected location, such as by opening a web page, displaying a video, playing audio, displaying content of an RSS feed, etc.

In a still further aspect, the user's interaction with the website can be tracked, and resulting tracking information can be displayed on the three-dimensional object. For example, an indication can be displayed at one or more locations on the three-dimensional object that the user has interacted with the portion of the available content of the website corresponding to the location(s). In another example, an indication can be displayed at one or more locations of the three-dimensional object of a popularity of the available content of the website corresponding to the location(s).

In another aspect of the present invention, a website visualization system is provided. The system includes a website content tracker and a rendering module. The website content tracker is configured to determine an amount of available content contained by a website. The rendering module is configured to generate an object display signal containing information to enable a display device to display a three-dimensional object. Each location of the surface of the displayed three-dimensional object corresponds to a portion of the amount of available content determined by the website content tracker. A display device receives the object display signal and displays the three-dimensional object.

In a further aspect, the system includes a mapper. The mapper is configured to map a selected location of the surface of the displayed three-dimensional object to the corresponding portion of the determined amount of available content contained by the website.

In a still further aspect, the system includes a user interaction tracker. The user interaction tracker is configured to track one or more interactions of a user with the content of the website.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 13 shows a table used for tracking website interaction information for users, according to an example embodiment of the present invention.

FIG. 14 shows a three-dimensional object providing indications of a user's interaction with content of a website, according to an example embodiment of the present invention.

Figure 1:
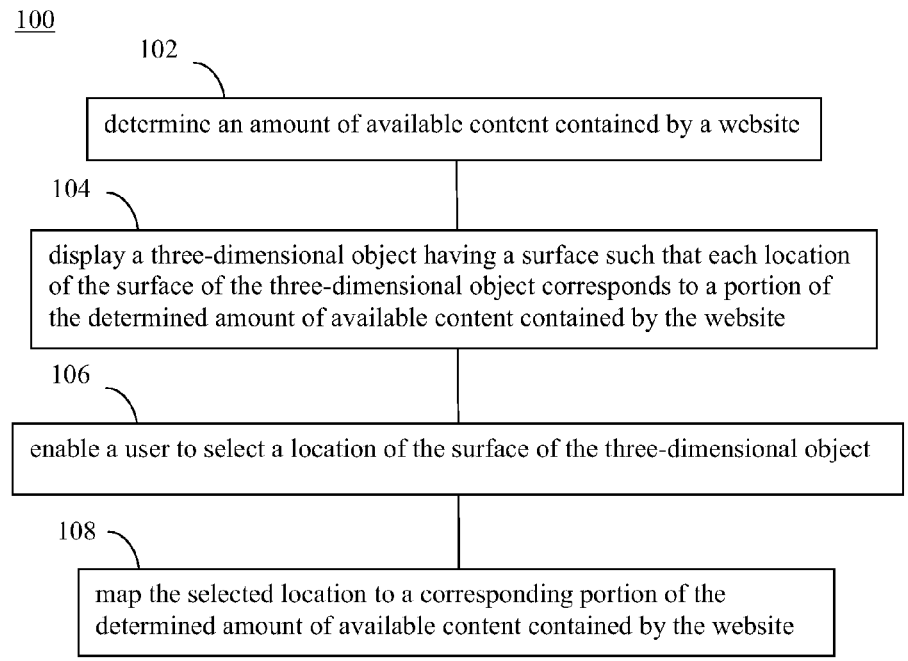
FIG. 1 shows a flowchart providing steps for visualizing a website, according to an example embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example Embodiments

The example embodiments described herein are provided for illustrative purposes, and are not limiting. Further structural and operational embodiments, including modifications/alterations, will become apparent to persons skilled in the relevant art(s) from the teachings herein.

Embodiments of the present invention enable users to ascertain the scope of websites, and provide users with convenient access to the content of one or more websites. Furthermore, embodiments may enable users to keep track of the particular content in a website that the users have previously accessed. In an embodiment, content of one or more websites is displayed in a graphical representation as a three-dimensional object. Different locations of the surface of the three-dimensional object represent/correspond to different portions of the content of the one or more websites.

In embodiments, a user interface enables the user to interact with the three-dimensional object, such as by enabling the user to zoom in/out, spin, rotate, and/or otherwise manipulate the three-dimensional object. In an embodiment, when a user selects (e.g., uses a pointer device to click on) a location of the three-dimensional object, the user traverses to content of the website corresponding to the selected location. The content may be displayed/played in a browser window adjacent to the three-dimensional object, on the three-dimensional object, and/or at other location.

The three-dimensional object may be used for personal content browsing history tracking with regard to the one or more websites, as well as general discovery navigation of the one or more websites. For example, the progress of a user through a website may be indicated on the surface of the three-dimensional object. Furthermore, in embodiments, the three-dimensional object may be used to illustrate attributes of one or more websites, such as a popularity of the content of the one or more websites across a portion or entirety of a user base of the website(s).

Figure 2:
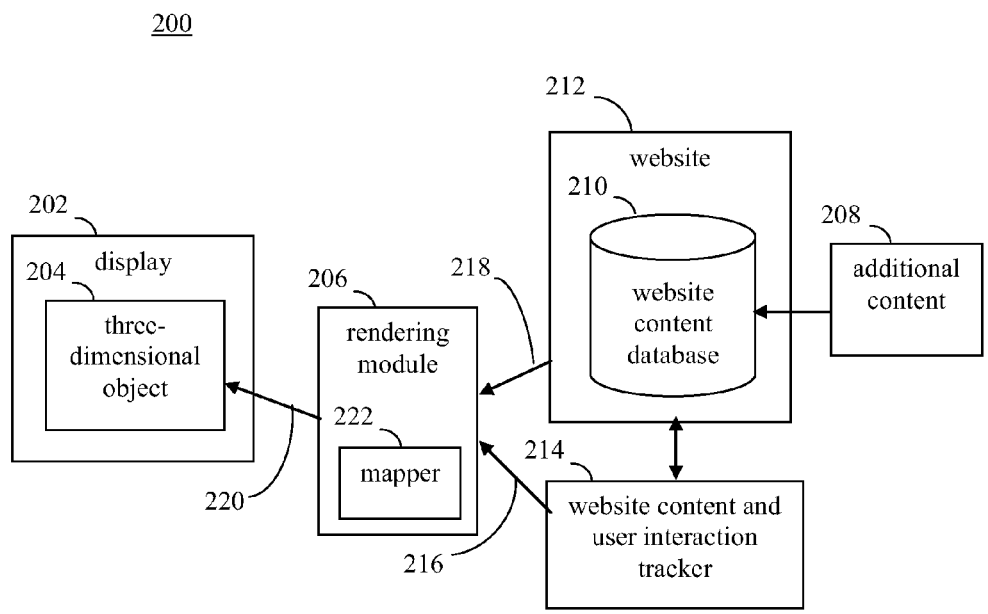
FIG. 2 shows a website visualization system, according to an example embodiment of the present invention.

FIG. 1 shows a flowchart 100 providing steps for visualizing a website, according to an example embodiment of the present invention. Although flowchart 100 is largely described below with regard to visualizing a single website using a three-dimensional object, a portion of a website, more than one website, and portions of one or more websites may be visualized using a three-dimensional object, according to embodiments of the present invention. For illustrative purposes, flowchart 100 is described with respect to a website visualization system 200 shown in FIG. 2. As shown in FIG. 2, website visualization system 200 includes a display 202, a rendering module 206 that includes a mapper 222, a website 212 that includes a website content database 210, and a website content and user interaction tracker 214. Other structural and operational embodiments will be apparent to persons skilled in the relevant art(s) based on the discussion regarding flowchart 100. Flowchart 100 is described as follows.

Flowchart 100 begins with step 102. In step 102, an amount of available content contained by a website is determined. According to step 102, a portion of all of a number of items of content externally accessible at a particular website, such as website 212 of FIG. 2, is determined (e.g., counted). Website 212 may be any type of website that provides access to a collection of content assets/items, such as web pages, images, videos, audio files, and/or other content. Website content database 210 is a database in which the content of website 212 resides. Website content database 210 may be contained in one or more storage devices, such as hard disc drives, optical storage devices, etc. Website 212 is typically hosted by one or more web servers, and may be accessed by users over one or more networks, such as the Internet. Note that in an embodiment, step 102 may include determining an amount of available content contained by additional websites to website 212.

Website content and user interaction tracker 214, which is coupled to website 212, tracks the amount of content contained in database 210 for website 212. For example, website content and user interaction tracker 214 may include an application configured to count the items of content residing in website content database 210 for website 212. Website content and user interaction tracker 214 may additionally/alternatively generate/maintain a list of the available content items (web pages, images, videos, audio files, and/or other content) of website 212 residing in website content database 210. Tracker 214 may be implemented in hardware, software, firmware, or any combination thereof. In an embodiment, tracker 214 may track content for additional websites.

In one example implementation provided for illustrative purposes, website content and user interaction tracker 214 may determine that fifty-four content items reside in website content database 210 for website 212, and may generate/maintain the following example list of content residing in website content database 210 for website 212:

1. webpage A
2. video file B
3. webpage C
4. image D
. . . .
53. RSS feed Y
54. audio file Z (Note that this list is provided for illustrative purposes, and that items in such a list can be listed in any format, such as by using descriptive text as shown above, link name, file name with extension, etc.).

Thus, website content and user interaction tracker 214 tracks content of website 212, including generating a count of the items/assets of website 212. Note that content of website 212 may be modified from time to time, such as through the addition of new content, deletion of existing content, and/or other modification of existing content. Website content and user interaction tracker 214 may be configured to adjust the determined amount of content items and/or the maintained list of content items pursuant to the modifications of the content of website 212. For example, as shown in FIG. 2, website content database 210 may receive additional content 208. Website content and user interaction tracker 214 may re-determine the amount of available content of website 212 after additional content 208 is received by website content database 210. Website content and user interaction tracker 214 may perform this re-determination as additional content 208 is received or on a periodic basis. Additional content 208 may include any type of content, including web pages, images, videos, audio files, and/or other content. Additional content 208 may be generated by any type of entity, including content developers/editors, by one or more received feeds (e.g., a RSS (Really Simple Syndication) feed), by users, etc.

In step 104, a three-dimensional object having a surface is displayed such that each location of the surface of the three-dimensional object corresponds to a portion of the determined amount of available content contained by the website. For example, as shown in FIG. 2, a three-dimensional object 204 is displayed by a display 202. Three-dimensional object 204 is displayed such that its surface corresponds to the available content of website 212 determined in step 102. The surface of three-dimensional object 204 may be segmented (visibly or non-visibly) such that each location of the surface corresponds to a portion of the amount of content contained by website 212. For example, if website 212 has one hundred content items, the surface of object 204 may be segmented into 100 regions. Each region may be approximately one-one hundredth ($\frac{1}{100}^{th}$) of an area of the surface of three-dimensional object 204 in size. In another example, if website 212 has one thousand content items, the surface of object 204 may be segmented into 1000 regions. Each region may be approximately one-one thousandth ($\frac{1}{1000}^{th}$) of an area of the surface of three-dimensional object 204 in size.

In embodiments, step 104 may include displaying the three-dimensional object such that the surface of the three-dimensional object corresponds to the entirety of the content of website 212, a portion of the content of website 212, a portion or all of the content of website 212 and one or more other websites, or other configuration of the content of one or more websites.

As shown in FIG. 2, rendering module 206 receives a tracking signal 216 from website content and user interaction tracker 214, and receives website information signal 218 from website 212. Tracking signal 216 includes the amount of content of website 212 determined by website content and user interaction tracker 214, and/or in some embodiments, may include the list of content of website 212 generated/maintained by website content and user interaction tracker 214. Website information signal 218 includes information regarding three-dimensional object 204 for display, including a description of three-dimensional object 204 (e.g., a shape/size description), one or more images to be displayed on and/or adjacent to object 204, and/or further information to be displayed with regard to object 204. Tracking signal 216 and website information signal 218 may be provided to rendering module 206 in any format, including as XML data.

Rendering module 206 generates graphical rendering information based on the received description of three-dimensional object 204, and any associated received images. Rendering module 206 generates an object display signal 220. Object display signal 220 contains the generated graphical information. Object display signal 220 is received by display 202, and enables display 202 to display three-dimensional object 204. Rendering module 206 may include hardware, software, firmware, or any combination thereof, to perform its functions. For instance, rendering module 206 may include a rendering application (e.g., a browser plug-in application) that is commercially available, such as Adobe Flash™, or may be a proprietary application.

Figure 3:
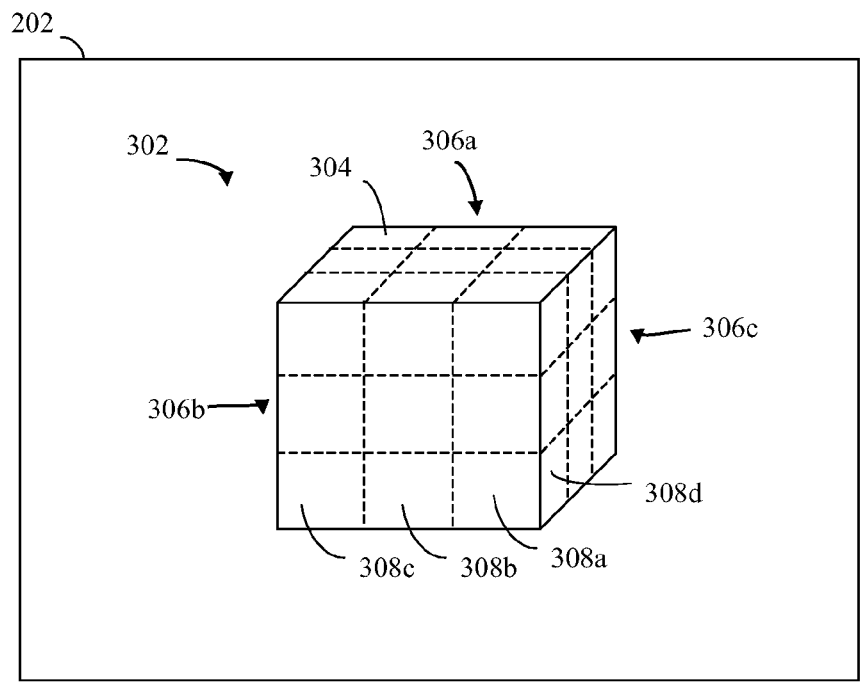
FIGS. 3 and 4 show views of an example three-dimensional object shown by a display, according to an embodiment of the present invention.
Figure 4:
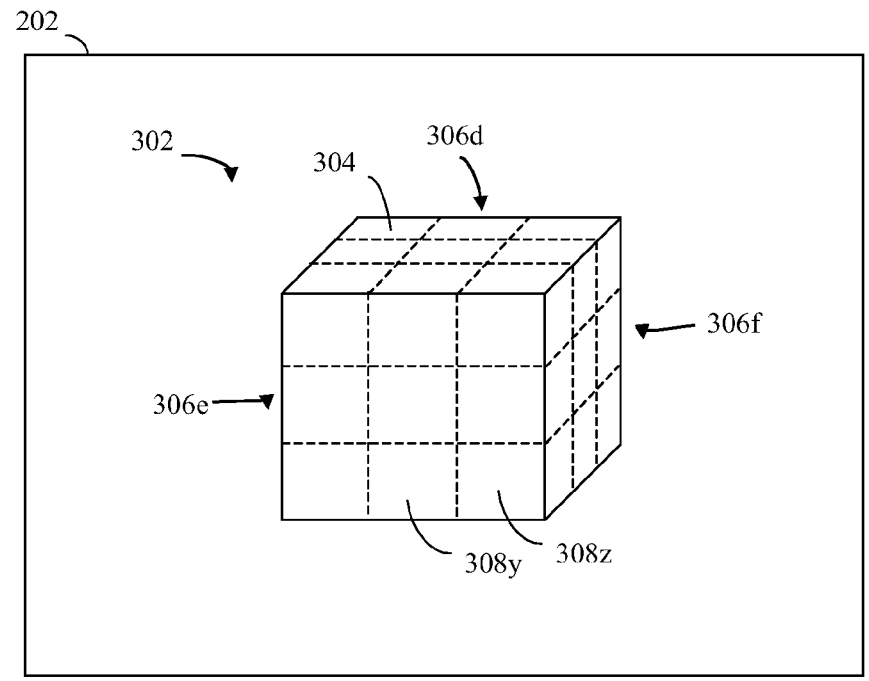

For instance, FIGS. 3 and 4 show views of an example three-dimensional object 302 displayed by display 202 (according to object display signal 220), as an example of three-dimensional object 204 of FIG. 2, according to an embodiment of the present invention. FIG. 4 shows a view of object 302 rotated 180 degrees from the view provided in FIG. 3. In FIGS. 3 and 4, three-dimensional object 302 is a cube having a surface 304 formed by six square sides 306a-306f. Each side 306 is segmented (as indicated by dotted lines) into nine locations 308. Thus, in the example of FIGS. 3 and 4, object 204 has fifty-four locations 308. For illustrative purposes, locations 308a-308c on side 306b and location 308d on side 306c are indicated in FIG. 3. Example locations 308y and 308z on side 306e are indicated in FIG. 4. Locations 308 of surface 304 may be equal sized, as shown in FIGS. 3 and 4. In alternative embodiments, locations 308 may have sizes that are different from each other. Furthermore, locations 308 may be rectangular as shown in FIGS. 3 and 4, or may other shapes, including round, triangular, hexagonal, or any other polygon or irregular shape.

Each location 308 of three-dimensional object 302 corresponds to a portion of the determined amount of available content contained by website 212. For instance, in the example described above where website 212 includes fifty-four content items, each of locations 308 may correspond to one of the fifty-four content items. In another example where website 212 includes 1,000 content items, surface 304 of object 302 may be divided into 1,000 locations 308, such as where each of sides 306a-306 includes 1,000÷6 (e.g., 166.67) locations 308, or some other distribution of locations 308 that totals 1,000. Surface 304 may be segmented into any number of locations 308, as dictated by the determined number of content assets/items of website 212.

In step 106, a user is enabled to select a location of the surface of the three-dimensional object. In FIG. 2, display 202 displays object 204 in a manner such that the surface of object 204 is selectable. For instance, in the example of FIGS. 3 and 4, object 302 is configured in display 202 such that a mouse or other pointer or user interface mechanism can traverse over surface 304 of object 302 to a particular location 308, to highlight and/or select the particular location 308. In an example embodiment, object 302 is displayed by a browser application, which enables the selectability of locations 308 of object 302. Such selectability may be enabled by HTML code, a software application such as a browser plug-in application (e.g., a JAVA or C++ application), and/or by other mechanism, as would be known to persons skilled in the relevant art(s).

In step 108, the selected location is mapped to a corresponding portion of the determined amount of available content contained by the website. For example, referring to FIG. 3, a user may select location 308a on surface 304 of object 302. According to step 104, each location of surface 304 of object 302 corresponds to a portion of website 212. Thus, location 308a selected by the user corresponds to a portion of website 212. The portion of website 212 to which location 308a corresponds may be determined/maintain in any manner.

Figures 5, 6:
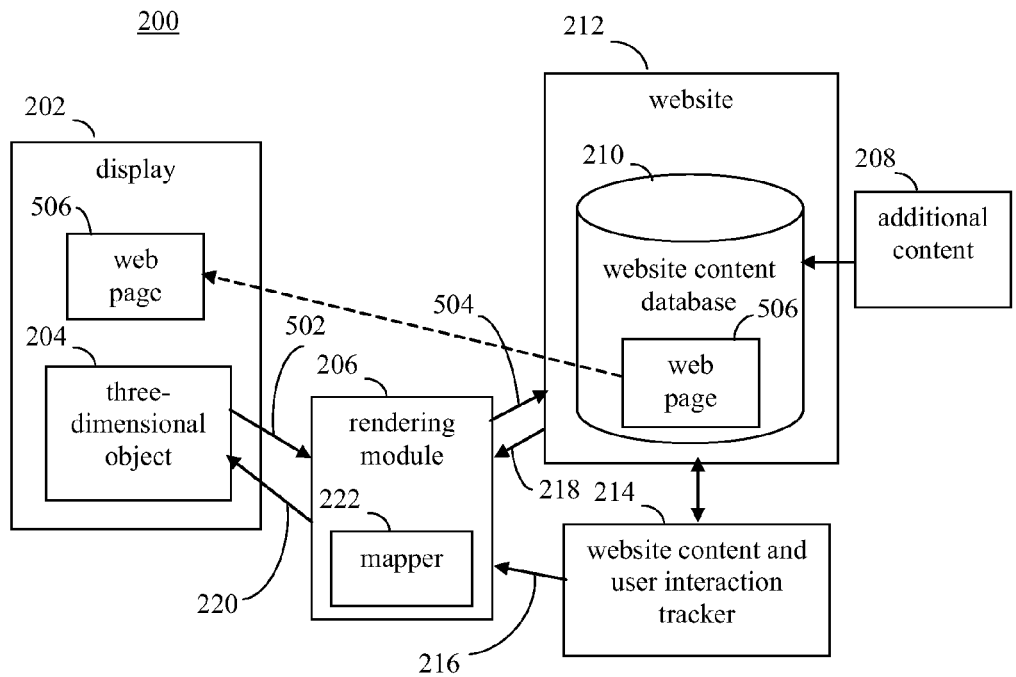
FIG. 5 illustrates operation of a mapper of the website visualization system of FIG. 2, according to an example embodiment of the present invention.
FIG. 6 shows an example mapping table that maps content of a website to corresponding locations of a three-dimensional object, according to an embodiment of the present invention.

For example, FIG. 5 illustrates operation of mapper 222, according to an example embodiment. Mapper 222 is configured to map a selected location 308 to a corresponding portion of website 212. Mapper 222 may include hardware, software, firmware, or any combination thereof to perform its functions. In embodiments, mapper 222 may be configured to map locations 308 to portions of website 212 according to a predetermined mapping (e.g., a mapping stored in a file), or may be configured to map locations 308 to portions of website 212 "on the fly."

For instance, when a user selects a location 308 on surface 304 of object 302, coordinates 502 (e.g., X, Y, and/or Z coordinates) of location 308 may be generated and transmitted to rendering module 206. In the case where surface 304 stems from an image having a two-dimensional area, X and Y coordinates of the selected location 308 may be returned as coordinates 502. The coordinates may be used to select a corresponding portion of website 212 from a list of the content of website 212. For instance, in the example of FIGS. 3 and 4, an X coordinate=1 and a Y coordinate=1 (1, 1) may be generated by the selection of location 308a (where surface 304 can be viewed as a 6 by 9 two-dimensional array of locations 308, for instance). For all pairs of received coordinates, a mapping algorithm of mapper 222 may calculate a position in a content list for the corresponding content. For example, the following list is reproduced from above:
1. webpage A
2. video file B
3. webpage C
4. image D
....
53. RSS feed Y
54. audio file Z Coordinates (1, 1) may be generated by the selection of 308a in FIG. 3, which may be mapped to position 1 in the above list. Thus "webpage A" in position 1 corresponds to location 308a. In another example, coordinates (6, 8) may be generated by the selection of location 308y in FIG. 4. Coordinates (6, 8) may be mapped by mapper 222 to the fifty-third content item of the above content list (RSS feed Y), because coordinates (6, 8) are the fifty-third set of coordinates in a 6 by 9 two-dimensional array. Mapper 222 can use any mapping algorithm/function, to map received location coordinates on object 302 to content items in a list for a website.

According to another embodiment, mapper 222 may store a mapping table that provides a predetermined mapping of locations 308 to portions of website 212. For instance, FIG. 6 shows an example mapping table 600 that maps content of website 212 to corresponding locations 308 of three-dimensional object 302. As indicated by the example of mapping table 600, webpage A of website 212 corresponds to location 308a of three-dimensional object 302. Video file B of website 212 corresponds to location 308b, webpage C of website 212 corresponds to location 308c, image D of website 212 corresponds to location 308d, RSS feed Y of website 212 corresponds to location 308y, and audio file Z of website 212 corresponds to location 308z. Further mapping of content of website 212 to locations 308 of object 302 is not shown in FIG. 6, for purposes of brevity.

As shown in FIG. 5, mapper 222 generates a mapped content indication 504, which indicates the content of website 212 determined to correspond to a selected location of object 204.

Figures 7, 8:
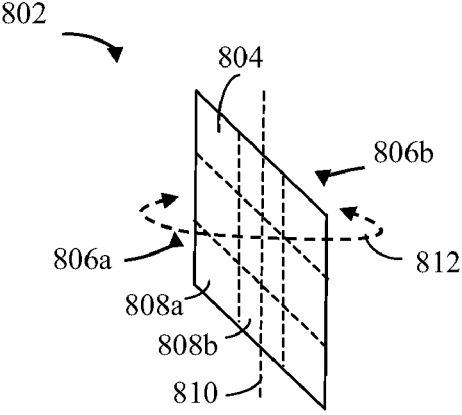
FIG. 7 shows an additional example step for the flowchart of FIG. 1, according to an embodiment of the present invention.
FIGS. 8 and 9 show example three-dimensional objects shown by a display, according to embodiments of the present invention.

In an embodiment, flowchart 100 of FIG. 1 further includes step 702 shown in FIG. 7. In step 702, a user is enabled to interact with the portion of the available content of the website corresponding to the selected location. For instance, as shown in FIG. 5, mapped content indication 504 is received by website 212. Website content database 210 transmits the stored content that is indicated by mapped content indication 504. In the example of FIG. 5, the indicated content is web page 506. Website content database 210 provides web page 506 to display 202. Display 202 displays web page 506. A user of display 202 can interact with displayed web page 506, such as viewing the content of web page 506 and/or selecting one or more links of web page 506, by using one or more user interface mechanisms (e.g., a mouse/pointing device, a keyboard, a thumbwheel, a touch pad, voice activation, etc.).

Three-dimensional object 204 of FIGS. 2 and 5 can be any object viewable in three dimensions. For example, three-dimensional object 204 can be a basic shape, such as a sphere, a cube (as shown in FIGS. 3 and 4), a rectangle, a pyramid, or any other three-dimensional polygon. Furthermore, three-dimensional object 204 can be a two-dimensional object, such as a planar triangle, square, rectangle, pentagon, hexagon, or any other planar polygon or irregular shape. For example, FIG. 8 shows display 202 displaying a three-dimensional object 802, according to an example embodiment of the present invention. In FIG. 8, object 802 is shown as a planar rectangle 802, viewed in perspective. Object 802 has a surface 804 formed by opposing first and second sides 806a and 806b. Each side 806a and 806b is segmented (visibly or non-visibly), as indicated by dotted lines, into nine locations 808. Thus, surface 804 of object 802 has eighteen locations 808 (nine locations 808 on each of sides 806a and 806b). For illustrative purposes, locations 808a and 808b are indicated on side 806b. Each location 808 of three-dimensional object 802 corresponds to a portion of the determined amount of available content contained by website 212 (e.g., eighteen content items/assets in the example of FIG. 8).

Figure 9:
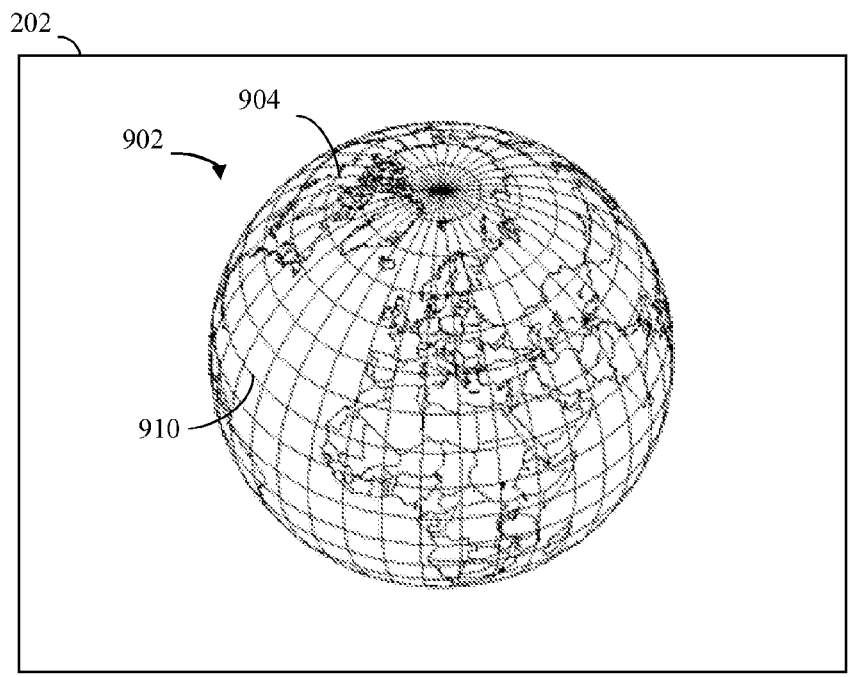

As shown in FIGS. 3, 4, and 8, three-dimensional objects 204 displayed by display 202 can have uniformly colored surfaces, such as having a uniform white or other color image for surface 304. Alternatively, objects 204 can have surfaces that are patterned according to any combination of colors and/or grayscale levels. For example, FIG. 9 shows display 202 displaying a three-dimensional object 902, according to an example embodiment of the present invention. In FIG. 9, three-dimensional object 902 is a spherical world globe. A surface 904 of object 904 is segmented into a plurality of locations that correspond to the determined amount of available content of website 212. In the example of FIG. 9, surface 904 is a world map image. An image on a surface of a displayed three-dimensional object, such as the world map image shown in FIG. 9, may be displayed as a line drawing image (as in FIG. 9), as a grayscale image, or as a single- or multi-color image.

Although shown in FIGS. 3, 4, 8, and 9 as being regularly-shaped, smooth objects (e.g., spheres, cubes, planar objects, etc.), three-dimensional objects 204 displayed by display 202 can have non-smooth surfaces and/or can have irregular shapes. For example, object 204 can be a vehicle (e.g., an automobile, a truck, a boat, an airplane, a spacecraft), a person or portion thereof (e.g., a person's head, hand, etc.), an animal, a consumer good/item, an item of popular culture (e.g., the Death Star, Bart Simpson, etc.), a planet or other astronomical body, or any other object that can be displayed in three-dimensions. In an embodiment, a plurality of different types of three-dimensional objects may be made available to a user. The user may select the three-dimensional object for display from the available plurality of three-dimensional objects. In another embodiment, the user may provide the user's own three-dimensional object for display. In still another embodiment, the three-dimensional object may be provided for display without any choice by the user.

In an embodiment, rendering module 206 may add one or more graphical features to be displayed on object 204. For example, as shown in FIG. 9 for three-dimensional object 902, rendering module 206 may add a grid 910 to be displayed on surface 904 of object 902. Grid 910 includes a plurality of horizontal and vertical grid lines that traverse surface 904 of object 902. Grid 910, and/or other graphical features, may be present on surface 904 to indicate attributes of object 902 and/or website 212. For example, grid 910 may be present on surface 904 to emphasize a three-dimensionality of object 902, to indicate separation between different selectable locations (e.g., locations 308 shown in FIGS. 3 and 4), and/or to indicate other attributes. In one embodiment, grid lines of grid 910 coincide with the borders of selectable locations. In another embodiment, grid lines of grid 910 may be present, but do not coincide with the borders of selectable locations.

Figure 10:
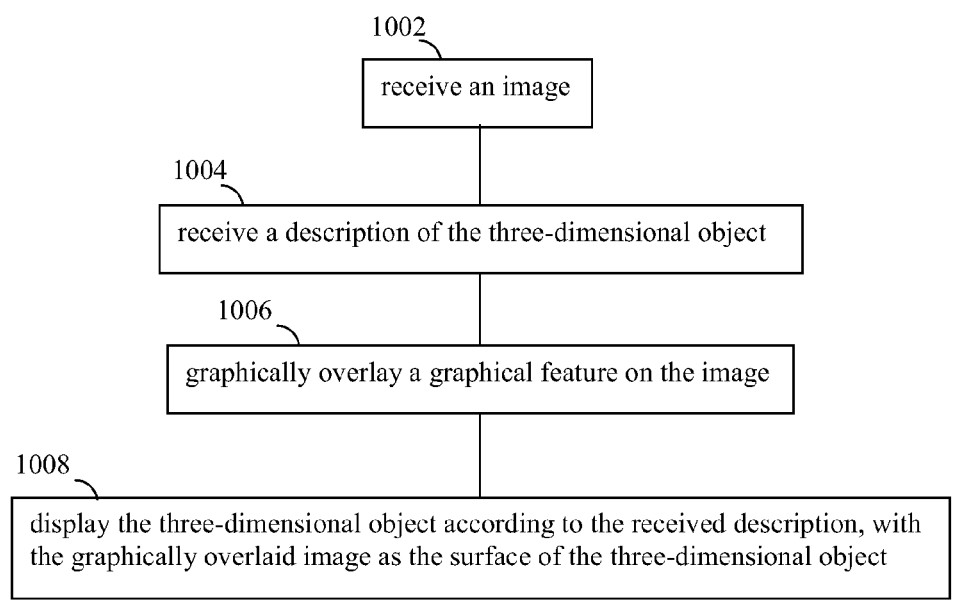
FIG. 10 shows a flowchart providing steps for displaying graphical features on a three-dimensional object, according to an example embodiment of the present invention.

Rendering module 206 may add graphical features for display on object 204 in any manner. For example, FIG. 10 shows a flowchart 1000 providing steps for displaying graphical features on a three-dimensional object, according to an example embodiment of the present invention. In an embodiment, steps 1002-1006 are performed by rendering module 206 shown in FIGS. 2 and 5. Flowchart 1000 is described as follows. Other structural and operational embodiments will be apparent to persons skilled in the relevant art(s) based on the discussion regarding flowchart 1000.

Flowchart 1000 begins with step 1002. In step 1002, an image is received. The image may be received as a two-dimensional image file, such as a bitmap image, GIF, JPEG, MPEG (for motion images) or other image file format. The image file may include any image desired to be displayed on a three-dimensional surface, including an exterior of a vehicle, an exterior of a person's body or portion thereof, the exterior of an animal, the exterior of a consumer good/item, the exterior of a planet or other astronomical body, or the exterior of any other object that can be displayed in three-dimensions. The image may be received from website content database 210 or other source.

In step 1004, a description of the three-dimensional object is received. The description of the three-dimensional object may be received in any format suitable for the particular embodiment of rendering module 206. The received description describes the shape of the object, such as object 902 (e.g., a sphere, defined by a radius), in enough detail to display the object in three-dimensions.

In step 1006, a graphical feature is graphically overlaid on the image. For example, the graphical feature may be a grid formed of horizontal and vertical grid lines. In such an embodiment, rendering module 206 dynamically draws the grid on the received image, in a manner that would be known to persons skilled in the relevant art(s). In further embodiments, other graphical features may be overlaid on the received image by rendering module 206, such as some graphical features described in further detail below with regard to FIGS. 14-16. Rendering module 206 generates object display signal 220 to include information enabling the display of the received image and graphical feature (e.g., grid) overlaid as the surface texture of the three-dimensional object.

In step 1008, the three-dimensional object is displayed according to the received description, with the graphically overlaid image as the surface of the three-dimensional object. For example, as shown in FIG. 9, display 202 displays three-dimensional object 902 (e.g., a sphere) with the image (e.g., world map) overlaid with grid 910 as surface 904.

Figure 11:
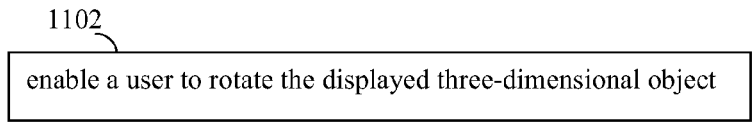
FIG. 11 shows an additional example step for the flowchart of FIG. 1, according to an embodiment of the present invention.

In embodiments, a user is enabled to interact with the three-dimensional object. For example, flowchart 100 of FIG. 1 may include step 1102 shown in FIG. 11. In step 1102, a user is enabled to rotate the displayed three-dimensional object. For example, with reference to FIG. 8, a user may be enabled to rotate three-dimensional object 802 around an axis 810 as indicated by arrow 812, and/or around one or more further axes. In the example of FIG. 9, a user may be enabled to rotate three-dimensional object 802 around a polar axis of the represented globe, and/or around further axes. The user may be enabled to rotate and/or otherwise manipulate a displayed three-dimensional object using a mouse/pointing device, and/or other user interface mechanism (e.g., keyboard, voice-activated, roller ball, thumbwheel, etc.). Display 202 and/or rendering module 206 may monitor the mouse (or other interface mechanism) and update the display of the three-dimensional object to indicate corresponding rotation and/or other movement of the object, such as zooming in/out, moving the object up/down/right/left in display 202, spinning, and/or otherwise manipulating the three-dimensional object.

Figure 12:
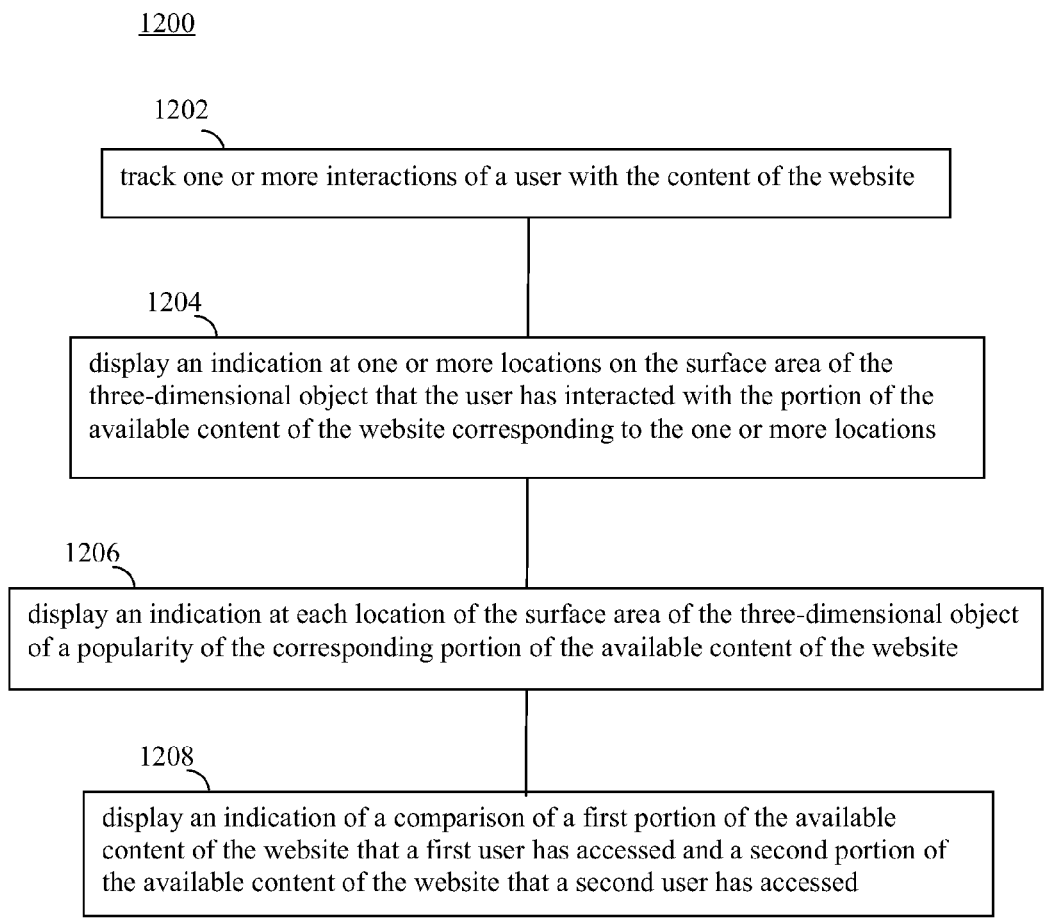
FIG. 12 shows a flowchart providing steps for tracking and displaying user interactions with a website, according to an example embodiment of the present invention.

In an embodiment, interactions of a user with website 212 may be tracked, and information resulting from the tracked interactions can be displayed by three-dimensional object 204. For instance, in an embodiment, FIG. 12 shows a flowchart 1200 providing steps for tracking and displaying user interactions with a website, according to an example embodiment of the present invention. Flowchart 1200 is described as follows.

Flowchart 1200 begins with step 1202. In step 1202, one or more interactions of a user with the content of the website are tracked. For instance, with reference to FIG. 5, a user may access website 212 (e.g., using a browser) to interact with the content of website 212, such as by viewing a video, listening to audio, viewing an RSS feed, or viewing web page 506. Web page 506 (or other content of website 212) may be accessed by interacting with three-dimensional object 204 (e.g., by selecting the corresponding location) to indirectly access website 212, or by directly interacting with website 212 through a browser. In an embodiment, the interaction with website 212 is tracked by website content and user interaction tracker 214. Website 212, a browser application, or rendering module 206, depending on the particular system embodiment, may communicate information to website content and user interaction tracker 214 indicating the particular content item, such as website 214, with which the user interacted.

Website content and user interaction tracker 214 may keep track of such interactions in any manner. For example, in an embodiment, tracker 214 may maintain tracking information in a list or table, such as table 1300 shown in FIG. 13. In first and second columns 1302 and 1304, table 1300 lists content of website 212 and a corresponding location on three-dimensional object 302, similarly to table 600 shown in FIG. 6. Furthermore, a third column 1306 of table 1300 lists a first user interaction flag corresponding to each content item listed in column 1302 of table 1300. The interaction flag indicates if the first user did interact with (e.g., "yes"), or did not interact with (e.g., "no") the corresponding content item of column 1302. For example, column 1306 indicates that the first user has interacted with webpage A, has not interacted with video file B, has not interacted with webpage C, has interacted with image D, has not interacted with RSS feed Y, and has interacted with audio file Z. Website content and user interaction tracker 214 enters tracking information into column 1306 as the first user interacts with content of website 212. In a similar fashion, a fourth column 1308 of table 1300 lists a second user interaction flag indicating whether a second user interacted with the content of first column 1302, and a fifth column 1310 of table 1300 lists a third user interaction flag indicating whether a third user interacted with the content of first column 1302. The interactions of any number of users may be tracked by website content and user interaction tracker 214.

Step 1204 may be performed in some embodiments. In step 1204, an indication is displayed at one or more locations on the surface area of the three-dimensional object that the user has interacted with the portion of the available content of the website corresponding to the one or more locations. In an embodiment, website content and user interaction tracker 214 transmits tracking information regarding a user to rendering module 206. Such tracking information may be transmitted by tracker 214 in the form of a portion or all of table 1300 shown in FIG. 13, or in other manner. Rendering module 206 receives the tracking information, and graphically incorporates the received tracking information into the display of three-dimensional object 204 to display an indication of the user's interaction with website 212.

For example, FIG. 14 shows display 202 displaying three-dimensional object 302 of FIG. 3 with interaction indications for the first user, according to an embodiment of the present invention. Column 1306 of table 1300 indicates that the first user interacted with the content corresponding to locations 308*a* and 308*b* (and location 308*z*, not shown in FIG. 14). Thus, in FIG. 14, interaction indications 1402*a* and 1402*b* are displayed at locations 308*a* and 308*d*, respectively, of surface 304 of object 302. Interaction indications 1402*a* and 1402*b* are shown in FIG. 14 as gray shading of locations 308*a* and 308*d* of surface 304. Indication 1402*a* indicates that the first user interacted with the content corresponding to location 308*a* (web page A), and indication 1402*b* indicates that the first user interacted with the content corresponding to location 308*d* (image D). Column 1306 of table 1300 also indicates that the first user did not interact with the content corresponding to locations 308*b* and 308*c* (and location 308*y*, not shown in FIG. 14). Thus, in FIG. 14, indications 1402 are not displayed at locations 308*b* and 308*c*. Object 302 may be rotated to view interaction indications 1402 for locations 308*y* and 308*z*, if desired.

Thus, a user can view three-dimensional object 302 as displayed in FIG. 14 (including rotating object 302 as desired) to determine how much of website 212 the first user has explored. As the user interacts with further content of website 212, further interaction indications 1402 will be displayed on locations 308 of object 302 to show this, which will lead to an increasingly larger percentage of surface 304 of object 302 being covered with indications 1402. Conversely, as additional content 208 (shown in FIGS. 2 and 5) is added to website 212, additional locations 308 of object 302 will be present on surface 304 without displaying indications 1402. Thus, as content is added to website 212, the percentage of surface 304 of object 302 displaying indications 1402 will decrease, showing that there is an increasing percentage of website 212 that the user can explore.

Step 1206 of flowchart 1200 in FIG. 12 may be performed in some embodiments. In step 1206, an indication is displayed at one or more locations of the surface area of the three-dimensional object of a popularity of the corresponding portion of the available content of the website. As described above, website content and user interaction tracker 214 may track interactions with website 212 by one or more users, such as the first, second, and third users indicated in table 1300 (columns 1306, 1308, and 1310). In an embodiment, a popularity indication for one or more content items of website 212 may be generated based on various factors, including how many users have interacted with the content items. For example, in an embodiment, tracker 214 may generate the popularity information shown in column 1312 of table 1300 from the information of columns 1306, 1308, 1310, and/or using further user interaction information. Alternatively, tracker 214 may transmit the user interaction information (e.g., data of columns 1306, 1308, 1310, etc.) to rendering module 206, and rendering module 206 may generate the popularity information of column 1312.

The popularity information of column 1312 may be generated in any manner, including by averaging. For example, a popularity indication for a content item/asset of a particular row of table 1300 can be calculated by dividing the number of user interactions with the content of the row by the total number of users, and optionally scaling/rounding the result. For example, for the first row of table 1300, 2 out of 3 total users (the first and third users) interacted with the content item (webpage A), as indicated by columns 1306, 1308, and 1310. Thus, a raw popularity indication may be calculated as 2 user interactions÷3 total users=0.67. The raw popularity indication may be multiplied by a scaling factor, such as 5, for a popularity indication of 5×0.67=3.35. The scaled popularity indication may be rounded, if desired. For example, in the current example, the scaled popularity indication of 3.35 may be rounded to 3, as indicated in table 1300. In a likewise manner, popularity indications of 2, 2, and 5 may be generated for the next three rows of table 1300 (for video file B, webpage C, and image D).

Figure 15:
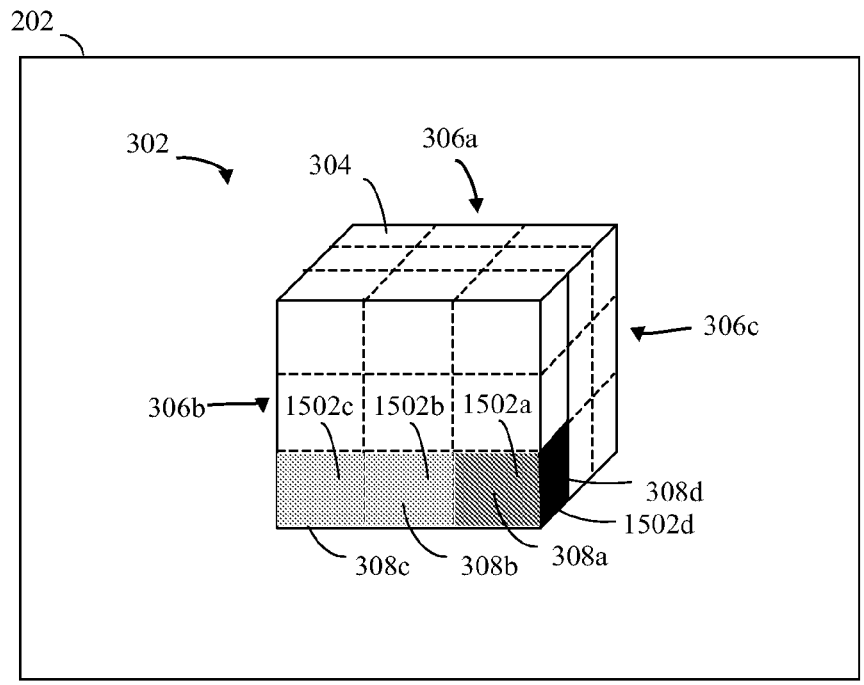
FIG. 15 shows a three-dimensional object providing content popularity indications, according to an example embodiment of the present invention.

Rendering module 206 graphically incorporates the popularity information into the display of three-dimensional object 204 to display an indication of the popularity of the content items of website 212. For example, FIG. 15 shows display 202 displaying three-dimensional object 302 of FIG. 3 with popularity indications 1502, according to an embodiment of the present invention. Column 1312 of table 1300 indicates a popularity of 3 for the content corresponding to locations 308*a*, a popularity of 2 for the content of locations 308*b* and 308*c* (and location 308*y*, not shown in FIG. 15), and a popularity of 5 for the content of location 308*d* (and location 308*z*, not shown in FIG. 15). Thus, in FIG. 15, popularity indication 1502*a* is displayed at location 308*a* at a medium grayscale indicating a popularity of 3. Popularity indications 1502*b* and 1502*c* are displayed at locations 308*b* and 308*c* at a relatively lighter grayscale indicating a popularity of 2. Popularity indication 1502*d* is displayed at location 308*d* having a relatively dark grayscale (e.g., black) indicating a popularity of 5.

Thus, a user can view three-dimensional object 302 as displayed in FIG. 15 (including rotating object 302 as desired) to determine a popularity of each content item of website 212. Such a display on object 204 may also be referred to as a "heat map", particularly when popularity indications 1502, or other types of indications, are shown in color.

Note that popularity indications 1502 and/or further types of graphical indications may be displayed on three-dimensional objects based on additional and/or alternative factors to the user interaction factors described above. For example, a popularity or other type of indication may represent a rating of a content item (e.g., rating a quality or other attribute of the content on a predetermined scale) provided by each user, a last time/date at which the content item has been viewed by each user, a number of times that each user has viewed the content item, and/or other factors/attributes.

Step 1208 of flowchart 1200 in FIG. 12 may be performed in some embodiments. In step 1208, an indication is displayed of a comparison of a first portion of the available content of the website that a first user has accessed and a second portion of the available content of the website that a second user has accessed. As described above, website content and user interaction tracker 214 may track interactions with website 212 by one or more users, such as the first, second, and third users indicated in table 1300. In an embodiment, access of the content of website 212 by a pair of users is compared. In an embodiment, tracker 214 may generate comparison information for a pair of users by comparing the information of two of columns 1306, 1308, 1310, and transmitting the resulting comparison information to rendering module 206. Alternatively, tracker 214 may transmit the user interaction information (e.g., data of columns 1306, 1308, 1310, etc.) to rendering module 206, and rendering module 206 may generate the comparison information.

Figure 16:
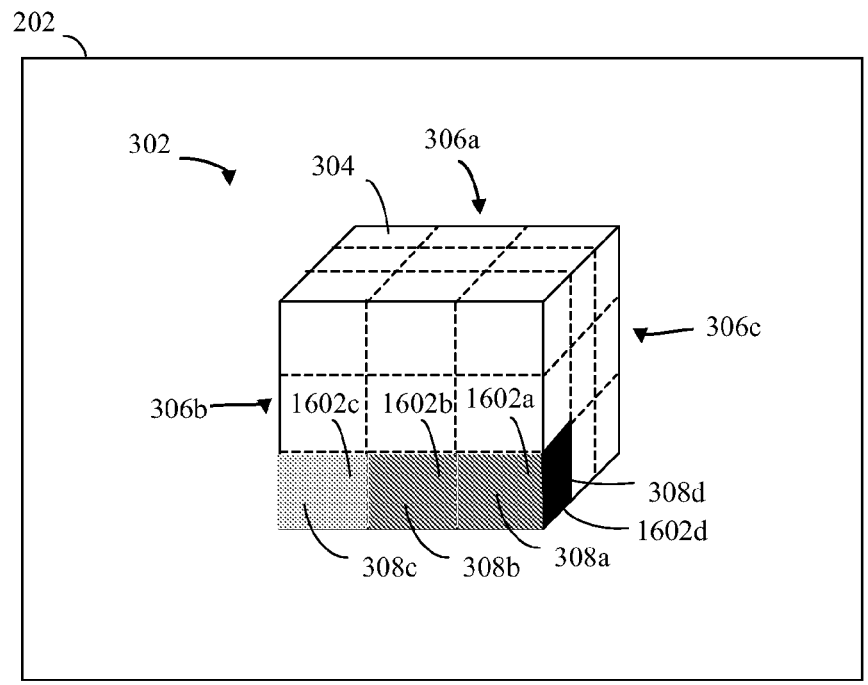
FIG. 16 shows a three-dimensional object providing a comparison of website content accessed by a pair of users, according to an example embodiment of the present invention.

Rendering module 206 graphically incorporates the comparison information into the display of three-dimensional object 204 to display an indication of the comparison. For example, FIG. 16 shows display 202 displaying three-dimensional object 302 of FIG. 3 with comparison indications 1602, according to an embodiment of the present invention. In the current example, comparison indications 1602 indicate a comparison of content access by the second and third users (columns 1308 and 1310) in table 1300. Comparison indications 1602*a* and 1602*b* displayed in locations 308*a* and 308*b* indicate that the second user did not access the content corresponding to locations 308*a* and 308*b* (webpage A and video file B), while the third user did access this content. Comparison indication 1602*c* displayed in location 308*c* indicates that the second user did access the content corresponding to location 308*c* (webpage C), while the third user did not access this content. Comparison indication 1602*d* displayed in location 308*d* indicates that the second user and third user both accessed the content corresponding to location 308*c* (image D). In FIG. 16, comparison indications 1602*a* and 1602*b* are displayed at locations 308*a* and 308*b* at a mid-range grayscale. Comparison indication 1602*c* is displayed at locations 308*c* at a relatively lighter grayscale. Comparison indication 1602*d* is displayed at location 308*d* at a relatively darker grayscale. If neither of the second and third users accessed content corresponding to a particular location, a comparison indication may be displayed at the particular location at a grayscale level to indicate this.

Thus, a user can view three-dimensional object 302 as displayed in FIG. 16 (including rotating object 302 as desired) to compare the extent to which two users (e.g., the user and a friend) have explored website 212. Such as comparison may be performed for any reason. For instance, a user may desire to compare the user's exploration of website 212 with a second user's exploration of website 212 to determine what content the second user has not interacted with, and to therefore be enabled to send one or more links to the second user to content that the second user has not explored.

Note that indications 1402 (FIG. 14), 1502 (FIG. 15), and 1602 (FIG. 16) may be displayed on three-dimensional objects in the form of any type of graphical indication. For example, indications may be displayed in grayscale (as in FIGS. 14 and 15), as a color or range of colors, as a still or motion image, as text, and/or as any other type of graphical indication, as would be known to persons skilled in the relevant art(s).

Figure 17:
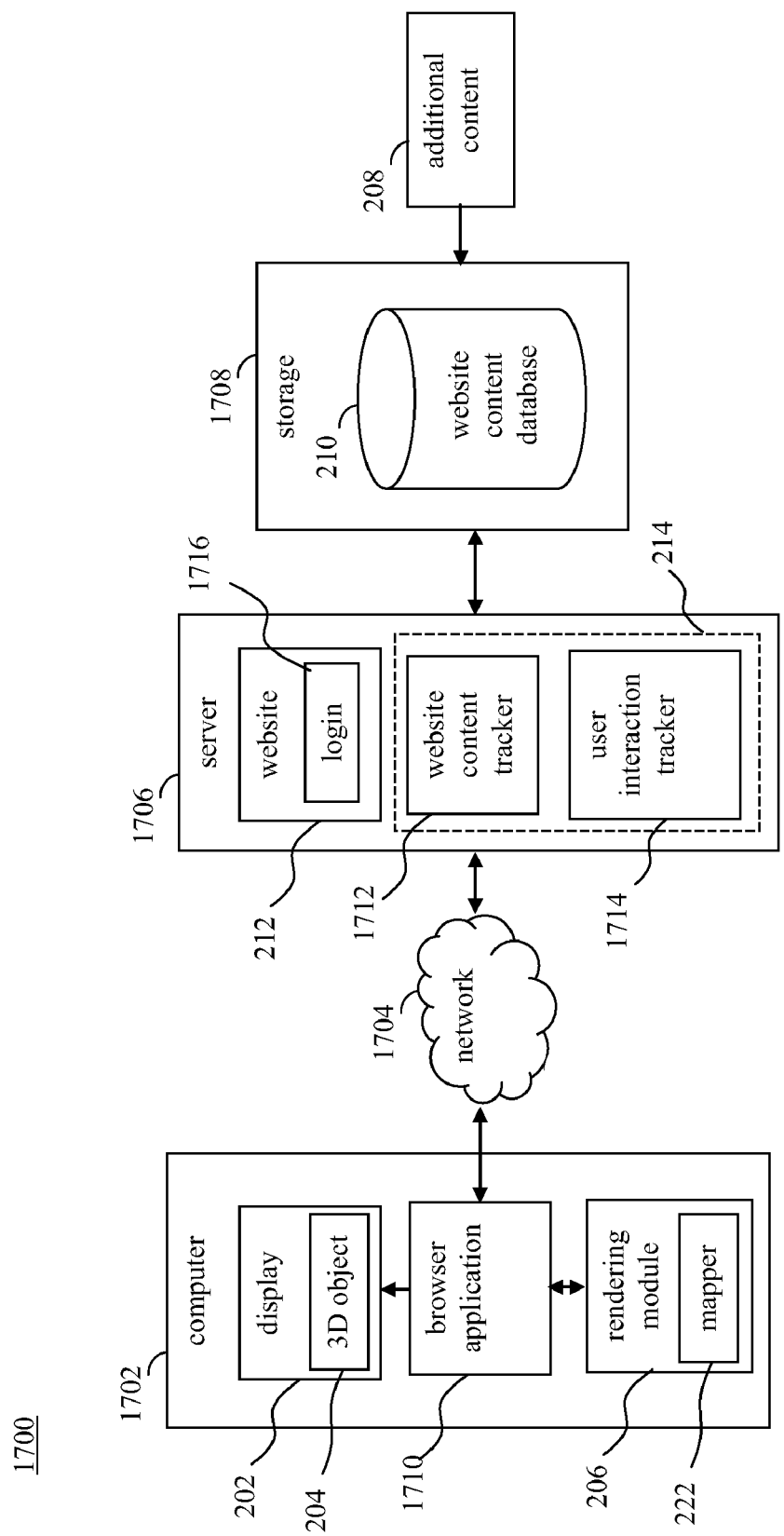
FIG. 17 shows a website visualization system, according to an embodiment of the present invention.

Embodiments of the present invention, such as system 200 shown in FIGS. 2 and 5, and the processes of flowcharts 100, 1000, and 1200 shown in FIGS. 1, 10, and 12, may be implemented in hardware, software, firmware, and any combination thereof. For example, FIG. 17 shows a website visualization system 1700, according to an embodiment of the present invention. System 1700 of FIG. 17 comprises a computer 1702, a network 1704, a server 1706, and storage 1708. Computer 1702 may be used by a user to access websites, such as website 212. As shown in FIG. 17, computer 1702 includes display 202, a browser application 1710, and rendering module 206. In the embodiment of FIG. 17, rendering module 206 includes mapper 222. Server 1706 hosts website 212, and includes website content and user interaction tracker 214.

Computer 1702 may be any type of computer, including a laptop computer, desktop computer, mobile computer, etc. Computer 1702 may include hardware, software, firmware, or any combination thereof to perform its functions. A user interacts with a user interface of computer 1702 to access browser application 1710. Browser application 1710 may be any type of proprietary or commercially available web browser application, such as Internet Explorer™, Mozilla Firefox™, Safari™, Opera™, or Netscape™. Browser application 1710 enables the user of computer 1702 to access website 212 at server 1706 over network 1704 in a known fashion. Network 1704 may be any type of communication network for computer systems, including a local area network (LAN), a wide area network (WAN), or a combination of networks such as the Internet.

Server 1706 may be any type of computer system capable of serving a website, as would be known to persons skilled in the relevant art(s). At server 1706, website 212 may provide a login 1716 for users to use to enable tracking of user information (e.g., by website content and user interaction tracker 214), although this is not required in all embodiments. For example, a user may input a user identification and password to login 1716 to enable tracking. As shown in FIG. 17, in an embodiment, website content and user interaction tracker 214 may include a website content tracker 1712 and a user interaction tracker 1714. Website content tracker 1712 may be configured to determine the number of items of content available at website 212, according to step 102 of flowchart 100 in FIG. 1. User interaction tracker 1714 may be configured to track user interaction with website 212, according to step 1202 shown in FIG. 12. Website content tracker 1712 and user interaction tracker 1714 may be implemented in hardware, software, firmware, or any combination thereof.

As shown in FIG. 17, rendering module 206 may be a plug-in application to browser application 1710. Rendering module 206 receives the determined content amount from website content tracker 1712 and receives tracking information from website user interaction tracker 1714 from server 1706 over network 1704. As described further above, rendering module 206 generates three-dimensional object 204 having a surface corresponding to the determined amount of content of website 212. Display 202 displays three-dimensional object 204. Computer 1702 may enable a user to interact with three-dimensional object 204 in display 202, such as by moving or rotating object 204, selecting locations of the surface of object 204, etc. As described above, mapper 222 may be used to map locations of a surface of object 204 to content of website 212 residing in website content database 210. Rendering module 206 may optionally generate object 204 to display one or more surface indications (e.g., user interactions, content popularity, user comparisons, etc.).

As shown in the embodiment of FIG. 17, website content database 210 resides in storage 1708 coupled to server 1706. Storage 1708 may be one or more storage devices of any type, including hard disc drives, optical disc drives, etc.

In an embodiment, a computer program product may include a computer usable medium having computer readable program code means embodied in the medium for visualizing content of a website. The computer readable program code may include: a first computer readable program code means for enabling a processor to determine an amount of available content contained by at least one website; a second computer readable program code means for enabling a processor to display a three-dimensional object having a surface such that each location of the surface of the three-dimensional object corresponds to a portion of the determined amount of available content contained by the at least one website; a third computer readable program code means for enabling a processor to select a location of the surface of the three-dimensional object; and a fourth computer readable program code means for enabling a processor to map the selected location to the corresponding portion of the determined amount of available content contained by the at least one website.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of visualizing content of a website, comprising:
    determining a scope of the website that includes one or more related web pages by determining an amount of content contained by the website, the determined amount of content indicating a number of content items contained by an entirety of the website;
    displaying a three-dimensional object having a surface such that each location of the surface of the three-dimensional object corresponds to a portion of the determined amount of content contained by the website, wherein the displaying the three-dimensional object comprises
        graphically overlaying a grid on an image that is segmented in a manner that corresponds to the number of content items contained by the entirety of the website; and
        displaying the three-dimensional object with the graphically overlaid image as the surface of the three-dimensional object;
    enabling the user to select a location of the surface of the three-dimensional object;
    mapping the selected location to a corresponding portion of the determined amount of content contained by the website using at least one processor; and
    displaying an indication at one or more locations on the surface of the three-dimensional object that the user has interacted with the portion of the determined amount of content of the website corresponding to the one or more locations.

2. The method of claim 1, further comprising:
    enabling the user to interact with the portion of the content of the website corresponding to the selected location.

3. The method of claim 1, further comprising:
    enabling a user to rotate the displayed three-dimensional object.

4. The method of claim 1, further comprising:
    re-determining the amount of content contained by the website after additional content is provided to the website; and
    displaying the three-dimensional object such that each location of the surface of the second displayed three-dimensional object corresponds to a portion of the re-determined amount of content contained by the website after additional content is provided.

5. The method of claim 1, further comprising:
    tracking one or more interactions of a user with the content of the website.

6. The method of claim 5, further comprising:
    displaying an indication at one or more locations of the surface of the three-dimensional object of a popularity of the content of the website corresponding to the one or more locations.

7. A system for visualizing content of a website, comprising:
    a computer; and
    a website content tracker configured to determine a scope of the website that includes one or more related web pages by determining an amount of content contained by the website, the determined amount of content indicating a number of content items contained by an entirety of the website; and
    a rendering module included in the computer that is configured to generate an object display signal containing information to enable display of a three-dimensional object having a surface, wherein each location of the surface of the displayed three-dimensional object corresponds to a portion of the determined amount of content contained by the website;
    wherein the object display signal is generated by the rendering module to contain information to enable display of an indication at one or more locations on the surface of the three-dimensional object that the user has interacted with the portion of the determined amount of content of the website corresponding to the one or more locations;
    wherein the rendering module is configured to graphically overlay a grid on an image that is segmented in a manner that corresponds to the number of content items contained by the entirety of the website, and to generate the object display signal to contain information to enable display of the three-dimensional object with the graphically overlaid image as the surface of the three-dimensional object.

8. The system of claim 7, further comprising:
wherein the rendering module receives the determined amount of content contained by the website from the website content tracker.

9. The system of claim 7, wherein a display receives the object display signal and displays the three-dimensional object.

10. The system of claim 9, wherein the object display signal is generated by the rendering module to contain information to enable display of an indication at one or more locations of the surface of the three-dimensional object of a popularity of the content of the website corresponding to the one or more locations.

11. The system of claim 9, further comprising:
means for enabling a user to rotate the displayed three-dimensional object.

12. The system of claim 9, further comprising:
means for enabling a user to select a location of the surface of the displayed three-dimensional object.

13. The system of claim 12, further comprising:
a mapper configured to map a selected location of the surface of the displayed three-dimensional object to the corresponding portion of the determined amount of content contained by the website.

14. The system of claim 12, further comprising:
means for enabling the user to interact with the portion of the content of the website corresponding to the selected location.

15. The system of claim 14, further comprising:
a user interaction tracker configured to track one or more interactions of a user with the content of the website.

16. A computer program product comprising a non-transitory computer usable medium having computer readable program code means embodied in said medium for visualizing content of a website, comprising:
a first computer readable program code means for enabling a processor to determine a scope of the website that includes one or more related web pages by determining an amount of content contained by the website, the determined amount of content indicating a number of content items contained by an entirety of the website;
a second computer readable program code means for enabling a processor to display a three-dimensional object having a surface such that each location of the surface of the three-dimensional object corresponds to a portion of the determined amount of content contained by the website;
a third computer readable program code means for enabling a processor to select a location of the surface of the three-dimensional object;
a fourth computer readable program code means for enabling a processor to map the selected location to a corresponding portion of the determined amount of content contained by the website; and
a fifth computer readable program code means for enabling a processor to display an indication at one or more locations on the surface of the three-dimensional object that the user has interacted with the portion of the determined amount of content of the website corresponding to the one or more locations;
wherein said second computer readable program code means comprises
a sixth computer readable program code means for enabling a processor to graphically overlay a grid on an image that is segmented in a manner that corresponds to the number of content items contained by the entirety of the website; and
a seventh computer readable program code means for enabling a processor to display the three-dimensional object with the graphically overlaid image as the surface of the three-dimensional object.

17. The computer program product of claim 16, further comprising:
an eighth computer readable program code means for enabling a processor to enable the user to interact with the portion of the content of the website corresponding to the selected location.

18. The computer program product of claim 16, further comprising:
an eighth computer readable program code means for enabling a processor to enable a user to rotate the displayed three-dimensional object.

19. The computer program product of claim 16, further comprising:
an eighth computer readable program code means for enabling a processor to track one or more interactions of a user with the content of the website.

20. The computer program product of claim 19, further comprising:
a ninth computer readable program code means for enabling a processor to display an indication at one or more locations of the surface of the three-dimensional object of a popularity of the content of the website corresponding to the one or more locations.

21. A system for visualizing content of a website, comprising:
a server;
a website content tracker included in the server that is configured to determine a scope of the website that includes one or more related web pages by determining an amount of content contained by the website, the determined amount of content indicating a number of content items contained by an entirety of the website, and to provide the determined amount of content contained by the website to enable a three-dimensional object having a surface to be displayed based on the determined amount of content contained by the website, each location of the surface of the displayed three-dimensional object corresponding to a portion of a determined amount of content contained by the website, wherein the displayed three-dimensional object comprises a graphically overlaid image as the surface of the three-dimensional object, the image being segmented in a manner that corresponds to the number of content items contained by the entirety of the website; and
a user interaction tracker configured to track one or more interactions of the user with the content of the website.

* * * * *